United States Patent
Forrest, Jr.

(10) Patent No.: US 9,638,604 B2
(45) Date of Patent: May 2, 2017

(54) FIBER OPTIC VIDEO INSPECTION SYSTEM AND METHOD

(71) Applicant: Illinois Tool Works Inc., Glenview, IL (US)

(72) Inventor: Edward J. Forrest, Jr., Marietta, GA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/672,891

(22) Filed: Mar. 30, 2015

(65) Prior Publication Data

US 2015/0285708 A1    Oct. 8, 2015

Related U.S. Application Data

(60) Provisional application No. 61/974,216, filed on Apr. 2, 2014.

(51) Int. Cl.
| | |
|---|---|
| *G01N 21/00* | (2006.01) |
| *G01M 11/00* | (2006.01) |
| *G02B 6/38* | (2006.01) |

(52) U.S. Cl.
CPC ............ *G01M 11/31* (2013.01); *G02B 6/385* (2013.01)

(58) Field of Classification Search
CPC .... G01J 3/02; G01J 3/513; G01J 3/51; G01N 15/1459; G01N 21/65
USPC .......................................................... 356/73
See application file for complete search history.

(56) References Cited

U.S. PATENT DOCUMENTS

| | | | |
|---|---|---|---|
| 2001/0055448 A1 | 12/2001 | Sato | |
| 2003/0117617 A1* | 6/2003 | Taylor | G02B 23/2469 356/241.4 |
| 2003/0194189 A1 | 10/2003 | Grothe | |
| 2004/0062488 A1* | 4/2004 | Wood | G02B 6/3874 385/70 |
| 2004/0247268 A1* | 12/2004 | Ishihara | A61B 5/0062 385/117 |
| 2005/0177208 A1* | 8/2005 | Irwin | A61N 5/0603 607/94 |
| 2006/0046575 A1* | 3/2006 | Allen | H01R 33/97 439/638 |
| 2010/0185099 A1* | 7/2010 | Johansson | A61B 5/0084 600/473 |

(Continued)

FOREIGN PATENT DOCUMENTS

| | | |
|---|---|---|
| WO | 9805945 A1 | 2/1998 |
| WO | 2012177821 A1 | 12/2012 |
| WO | 2013097041 A1 | 7/2013 |

OTHER PUBLICATIONS

International Search Report for PCT/US2015/023838 dated Jun. 23, 2015.

*Primary Examiner* — Tarifur Chowdhury
*Assistant Examiner* — Md M Rahman
(74) *Attorney, Agent, or Firm* — Levenfeld Pearlstein, LLC (57) ABSTRACT

A fiber optic connector inspection device includes a boroscope tool, a wand operably connected to the boroscope tool, a light source and a lens. The light source and the lens are mounted at about an end of the wand. The lens is movable relative to the connector to be inspected. The system provides for observing images on a screen operably connected to the boroscope tool. A method for inspecting the radial face and axial face of a fiber optic ferrule is also disclosed.

7 Claims, 7 Drawing Sheets

Fig. 2

(56) References Cited

U.S. PATENT DOCUMENTS

| | | | | |
|---|---|---|---|---|
| 2010/0290744 A1* | 11/2010 | Zhou | ................... | G02B 6/3833 |
| | | | | 385/89 |
| 2014/0063598 A1* | 3/2014 | Zhou | ................... | G02B 6/3866 |
| | | | | 359/368 |
| 2014/0268114 A1* | 9/2014 | Zhou | ....................... | B08B 5/02 |
| | | | | 356/73.1 |
| 2014/0354977 A1* | 12/2014 | Zhou | ..................... | G01M 11/30 |
| | | | | 356/73.1 |
| 2015/0063761 A1* | 3/2015 | Hallett | ................ | G02B 6/3826 |
| | | | | 385/86 |

* cited by examiner

FIBER OPTIC VIDEO INSPECTION SYSTEM AND METHOD

CROSS-REFERENCE TO RELATED APPLICATION DATA

This application claims the benefit of and priority to Provisional U.S. Patent application Ser. No. 61/974,216, filed Apr. 2, 2014.

BACKGROUND

Communication systems and platforms are often combinations of copper, wireless and fiber optic media. Transmission rates and capacities have increased and are now measured in gigabytes and terabytes per second to a contemporary standard of ten gigabytes per second. Research continues to move transmission rates toward petabytes and beyond.

In order to achieve, maintain, and even surpass these transmission rates, transmission media and in particular fiber optic conductors must be fabricated and maintained to exacting standards and tolerances. This is particularly so in the fabrication, manufacture, installation, maintenance and testing of fiber optic component end faces. These end faces frequently become contaminated with dirt, dust, oil, grease, and other debris. Contamination, dry, fluidic and combinations thereof can have a significant impact on the quality (e.g., speed and integrity) of transmission across fiber optic networks. As such, cleaning the fiber optic connectors preserves the quality of these very high-speed transmissions. Various types of fiber optic connectors are known. Some of these connectors permit the joining of single optical fibers. Other types of connectors more efficiently permit the joining or connecting of multiple fibers in a single physical connector body. The various types of connectors as such have differing physical structures, connector configurations, components and the like.

In order to properly clean fiber optic connectors, some manner by which the connectors can be inspected is required. Nevertheless, many such connectors are cleaned "blind". That is, the connectors are cleaned without a direct or indirect visual inspection. A direct viewing of the connector can be made using some type of inspection device, such as a magnifying glass to protect the eye from being subjected to laser light energy.

Another way in which connectors are inspected is using a fiber optic video scope or amplified video camera to provide an enhanced view of small micron particles (on the order of 1-3 microns). While these inspection techniques provide protection for the user's eye in that they are indirect (e.g., via a video camera) viewing, such devices are limited in their field of view and offer limited 2-dimensional fiber optic viewing. Hand-held inspection devices typically use a paddle with magnification between about 125× to about 400×, and capture images in the range of about 250 microns (μm) to about 500 μm radius of the core.

Moreover, there is often contamination that cannot be discerned within the field of view of known video scopes. This can be due to the nature of the contamination, e.g., dry, fluidic or combinations thereof, the location of the contamination, e.g., across the fiber end face, along the length of the fiber, along the ferrule and the like, and other factors present. Furthermore, video inspection scopes that have 100-200× magnification can suffer from lower than desired resolution of debris and contamination.

Accordingly, there is a need for a fiber optic inspection device that can be used to effectively inspect a fiber optic connector. Such as device provides a higher degree of inspection quality than an unaided visual inspection and has a wider field of view than known video inspection scopes. Desirably, such a device provides inspection capabilities along the entire end face of the ferrule, as well as along the length of the ferrule assembly, and assures high quality inspection in a low cost device. More desirably still, such a device can be used with a wide variety fiber optic connectors precluding the need for multiple tools for inspection of different connector types.

SUMMARY

A fiber optic connector inspection device includes a boroscope tool, a wand operably connected to the boroscope tool, a light source mounted within the wand, a lens mounted within the wand and an adapter. The light source and the lens are mounted at about an end of the wand and the adapter is configured to mount the wand to a plurality of different fiber optic connectors.

In an embodiment, the fiber optic inspection device is used to effectively inspect a fiber optic connector with a higher degree of inspection quality than an unaided visual inspection and with a wider field of view than known video inspection scopes. An embodiment of the device provides inspection capabilities along the entire end face of the ferrule, as well as along the length of the ferrule assembly, and assures high quality inspection in a low cost device. An embodiment of the device can be used with a wide variety fiber optic connectors precluding the need for multiple tools for inspection of different connector types.

In an embodiment, the wand is a flexible wand and the light source and the lens are mounted in a housing at the end of the wand. One light source can be one or more light emitting diodes.

An adjusting member can be operably mounted between the adapter and the wand. The adjusting member is configured to permit movement of the wand toward and away from the fiber optic connector to adjust a distance between the lens and the fiber optic connector. This facilitates adjusting for the focal length of the lens.

The fiber optic connector can be, for example, an alignment sleeve and the adapter can be configured for receipt of alignment sleeves of different shapes and sizes. In an embodiment, the adapter is formed from a resilient material.

A method for inspecting the radial face and axial surface of a fiber optic ferrule includes providing a fiber optic connector inspection device having a boroscope tool, a wand operably connected to the boroscope tool, a light source and a lens, wherein the light source and the lens are mounted at about an end of the wand, mounting an adapter that is operably mounted at about the end of the wand to an associated alignment sleeve and observing images on a screen operably connected to the boroscope tool.

An embodiment of a method can include adjusting a distance between the lens and the associated alignment sleeve.

BRIEF DESCRIPTION OF THE DRAWINGS

The benefits and advantages of the present disclosure will become more readily apparent to those of ordinary skill in the relevant art after reviewing the following detailed description and accompanying drawings, wherein.

DETAILED DESCRIPTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment, size or shape illustrated.

Figure 1:
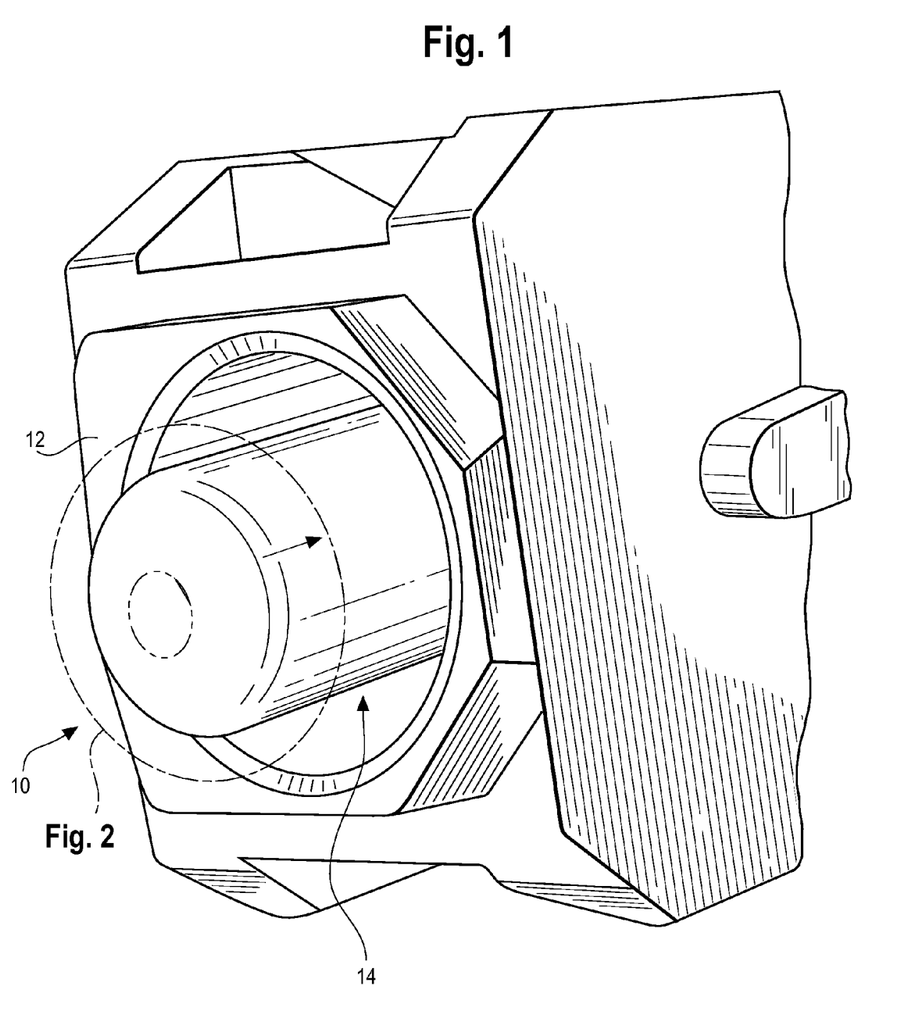
FIG. 1 is a perspective view of an example of a fiber optic end face and connector that may be inspected using the fiber optic video inspection system and method of the present disclosure.
Figure 2:
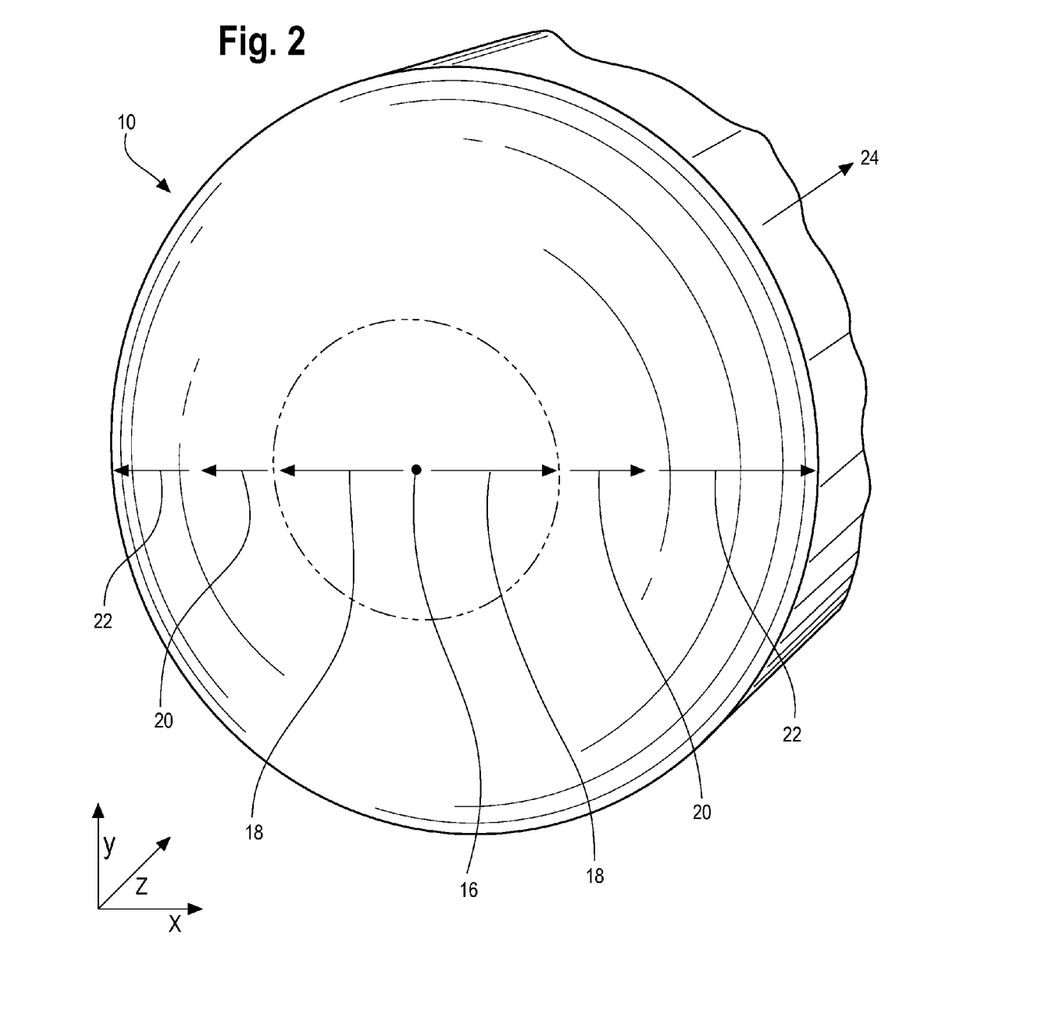
FIG. 2 is an enlarged schematic view of the end of a fiber optic end face illustrating the various zones of the end face.

Referring to the figures and in particular to FIGS. 1 and 2 there is shown a fiber optic end face 10 and connector 12 with Zones 1-5 defined about the ferrule 14. For purposes of the present disclosure, Zones 1-4 are defined along the end face of the connector in an x-y plane. Zone 1, indicated at 16, is defined as the center or core of the connector—it is the fiber core end. Zone 2, indicated at 18, is defined as the region extending from the core to and including the cladding or reflective surface of the fiber. In known fiber optic systems Zone 2 typically extends about 25-30 µm from the center of the fiber or core. Zone 3, indicated at 20, is defined as the area that extends about 250-300 µm from the center of the fiber or the core, per International Electrotechnical Commission (IEC) standards. Zone 4, indicated at 22, is defined as the region across the end of the ferrule in the x- and y-directions), encompasses the entirety of the face in the x-y directions), and Zone 5, indicated at 24, is defined as the region starting at about the outer edge of the ferrule and extending along the length of the ferrule (in the z-direction).

Figure 3:
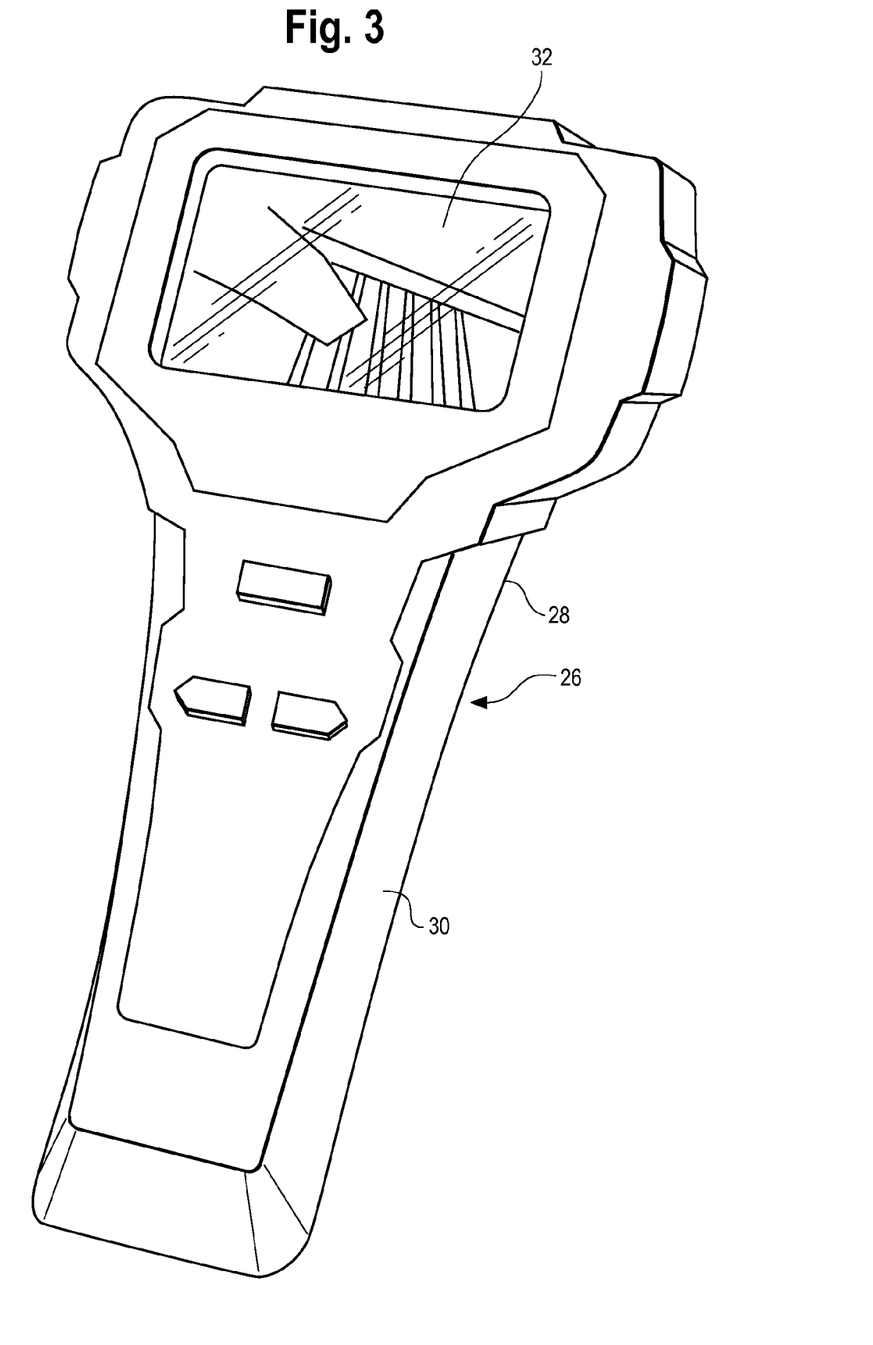
FIG. 3 is a portion of a hand-held boroscope tool used in the inspection of fiber optic connectors.
Figure 6:
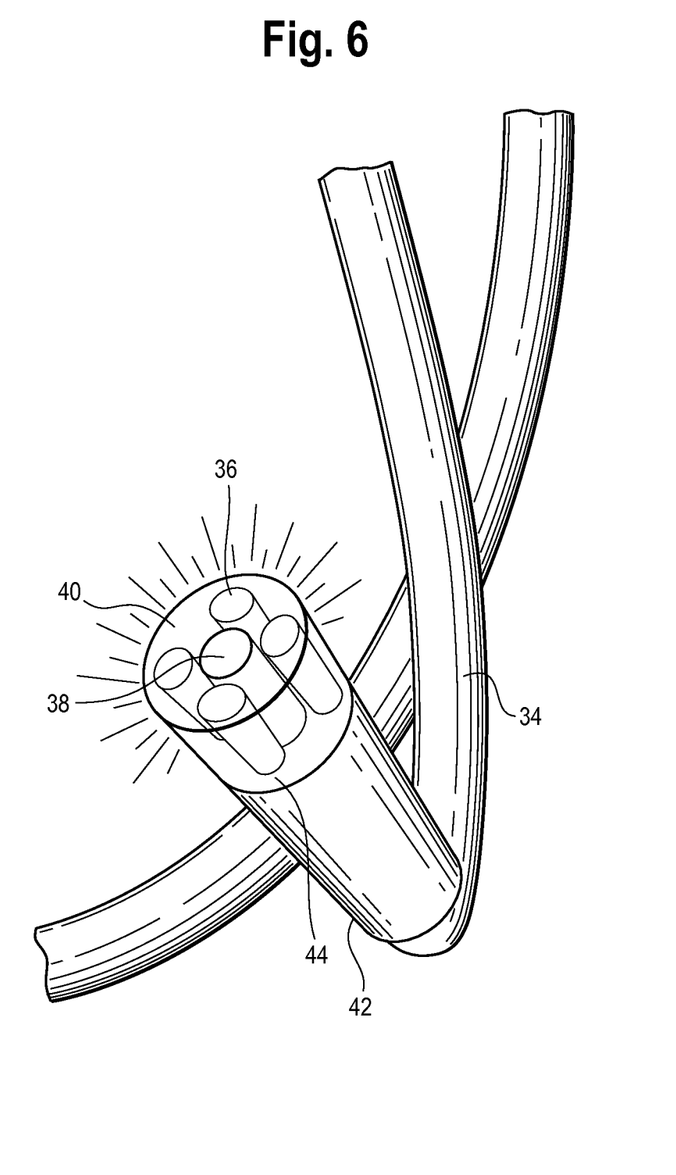
FIG. 6 illustrates the end of the wand portion with a soft adaptor positioned thereon.
Figure 7:
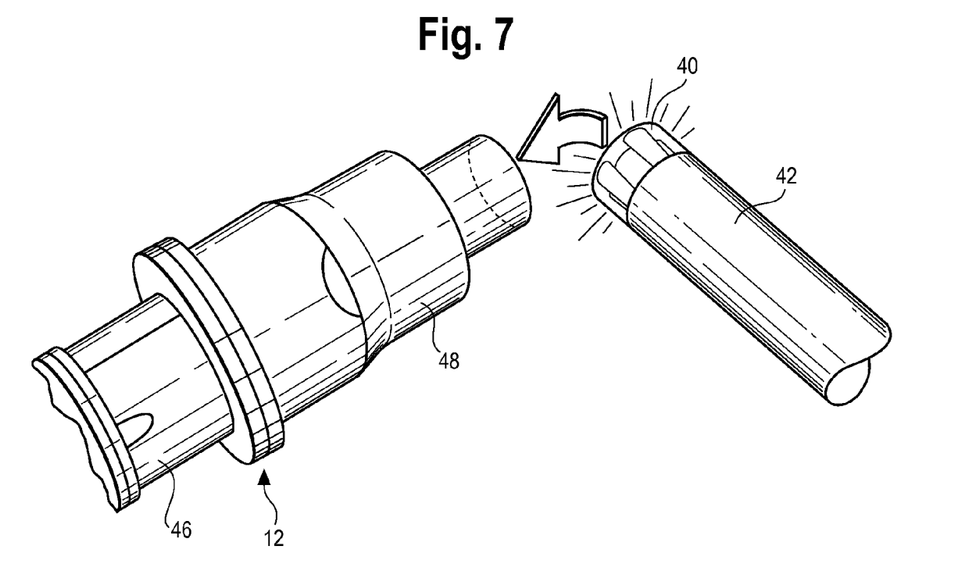
FIG. 7 illustrates the tool wand portion and a fiber optic connector with the soft adaptor positioned on the connector.

An embodiment of a video inspection system 26 is shown in FIGS. 3-7. As seen in FIGS. 3 and 6, the system includes a boroscope tool 28 having a body 30 with a monitor/screen 32 and, in an embodiment, sufficient memory (not shown) to record or capture video images. The boroscope tool 28 further includes a power supply, such as a rechargeable battery (also not shown), to allow remote, hand-held use and appropriate controls, for example, an on-off switch. Those skilled in the art will recognize such a tool and the features available with the tool.

Figure 4:
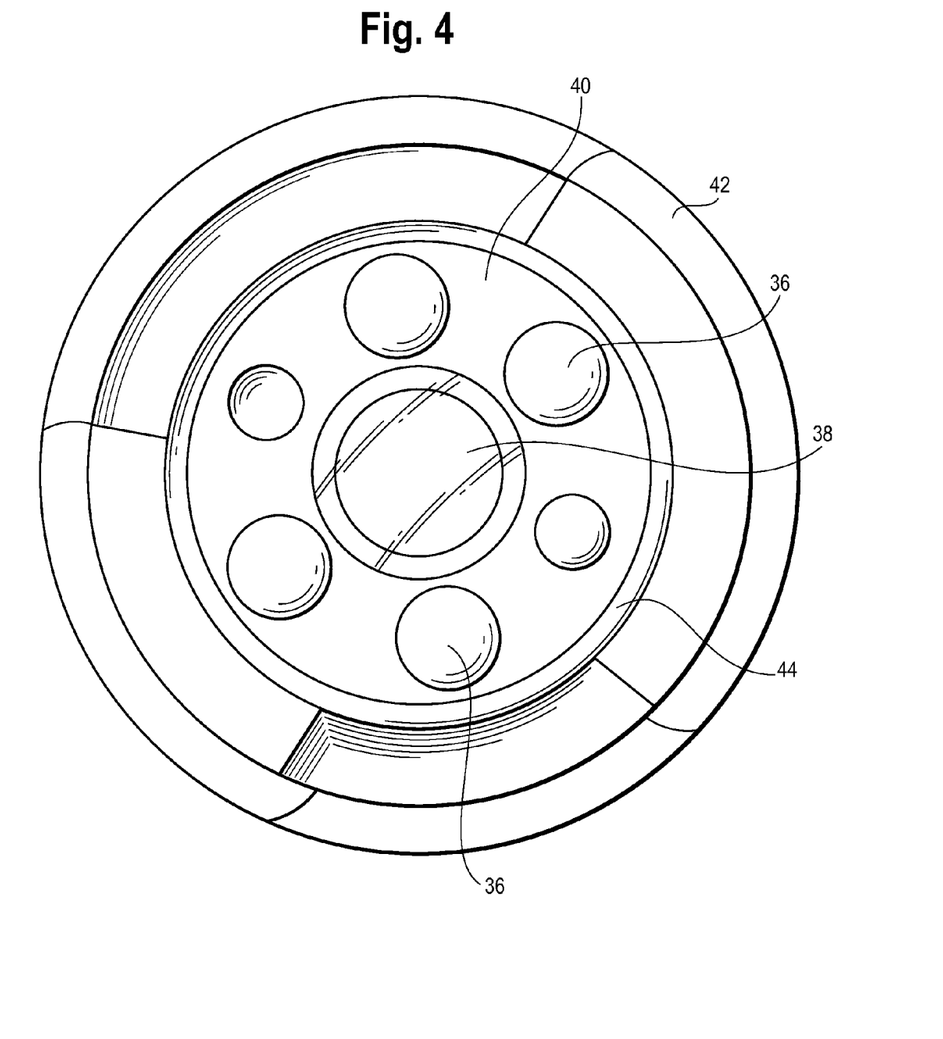
FIG. 4 is an end view of the wand portion of the inspection tool.
Figure 5:
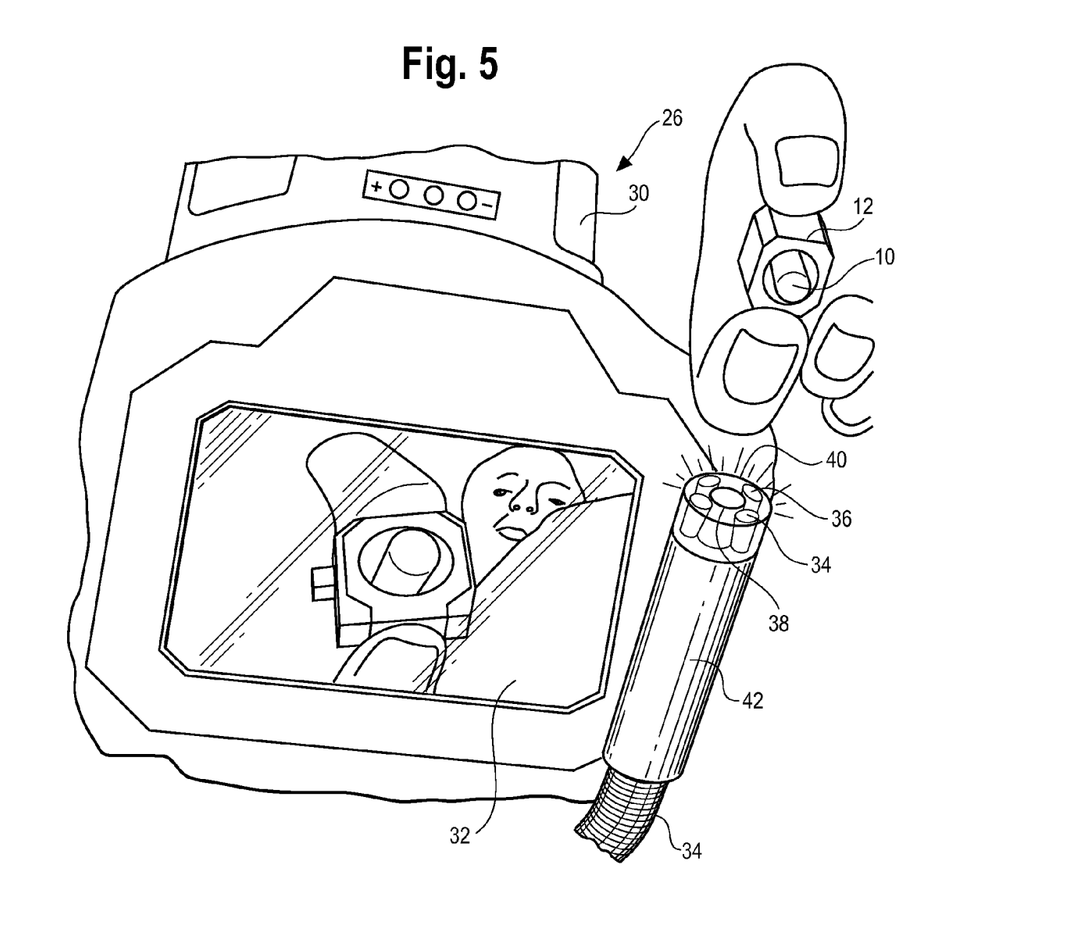
FIG. 5 is an illustration of the screen and a portion of the wand portion of the tool.

The boroscope tool 28 includes a flexible wand 34 at the end of which is a light source 36, a camera 38 and a lens 40. It is contemplated that a flexible wand 34 can be about 12-24 inches in length to allow for manipulating the viewing capabilities of the tool 28. The light source 36 and lens 40 can be mounted in a probe or housing 42 to facilitate handling and use of the tool 28. One exemplary light source 36 is one or a series of LEDs mounted within the probe 42 along with the lens 40. A present lens 40 is a ball lens. The lens 40 is appropriately sized and is formed from an appropriate material (e.g., fused silica, sapphire, ruby or the like). The lens 40 is mounted in a mount 44 within the probe 42. The mount 44 is configured to maintain the lens 40 in place and in proper position relative to the light source 36.

Figure 8:
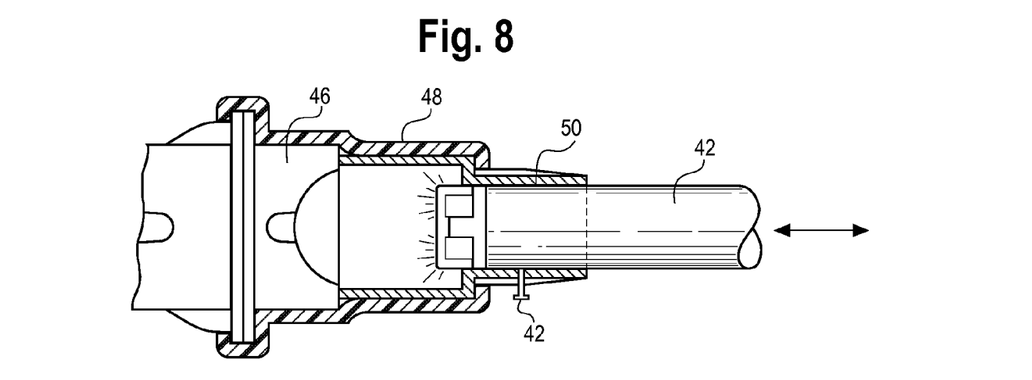
FIG. 8 is a cross-sectional view of the connector and soft adaptor on an alignment sleeve and mounted to the probe.

FIG. 8 illustrates one traditional alignment sleeve 46 for use in fiber optic inspection. Other traditional alignment sleeves will be recognized by those skilled in the art. An adapter 48 mounts the alignment sleeve 46 to the boroscope tool wand 34. In one embodiment, the adapter 48 is formed from a resilient material to allow one end of the adapter 48 to conform to the shape of the alignment sleeve 46 and to allow the other end of the adapter 48 to conform to the shape of the boroscope wand 34 end or probe 42 (the end of the wand 34 in which the lens 40 and light sources 36 are mounted). In this embodiment both the alignment sleeve 46 and the wand end 34 are friction fitted within the adapter 48. It is, however, anticipated that other types of mounting arrangements will be used, which other mounting arrangements are within the scope and spirit of the present disclosure.

In an embodiment, an adjusting member 50 is positioned between the sleeve 46 and the adapter 48 to allow for adjusting the distance between the wand 34 end or probe 42 (e.g., that contains the lens 40) and the fiber optic end face/fiber optic connector 10/12. The adjusting member 50 can be formed within the adapter 48 to move the wand 34 and/or the connector 12 relative to one another. In an embodiment, the adjusting member 50 moves the wand end or probe 42 relative to the adapter 48. In an embodiment, the adjusting member 50 is a jack screw or other type of device that allows for movement of the wand end or probe 42 to the relative to the adapter 48 to adjust the focal length for the lens 40. Other types of adjusting devices will be recognized by those skilled in the art.

Movement of the probe 42 relative to the adapter 48 provides a number of functions. It allows for adjusting the focal length for the lens 40 to properly focus on the various parts of the fiber optic end face 10 and connector 12. In addition, the ability to adjust the distance between the wand end or lens 40 and the end face 10/connector 12 permits focusing the lens 40 at various locations along the axial length of the fiber optic fitting (e.g., the end face 10 and connector 12), that is, along the length of the fitting. In this manner, the present inspection system allows for inspection of the horizontal end face (e.g., Zones 1-4, indicated at 16-22) and along the length of the ferrule (e.g., Zone 5, indicated at 24) to inspect the face or surface of the fiber optic connector/ferrule, thus providing inspection capability across the entirety of the fiber optic end face 10 and connector 12 (the x-y plane), which corresponds to Zones 1-4, as well as along the face or surface along the length of the ferrule (within the connector 12, in the z-direction) which corresponds to Zone 5.

The present system 26 provides a go/no-go video inspection of, for example, 2.5 mm, 1.25 mm, MT-type as well as expanded beam connections. It allows for inspecting the entire radial face (Zones 1-4) and axial surface (Zone 5) of a ferrule or connector 12. Moreover, it allows for the inspection of a wide variety of fiber optic connectors 12 with a single wand 34 to fiber optic connector 12 adapter 48 to achieve a proper focal length for the lens 40.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A fiber optic connector inspection device comprising:
   a boroscope tool;
   a wand operably connected to the boroscope tool, the wand having a proximal end at the boroscope tool and a distal end opposite to the proximal end;
   a housing disposed at the distal end of the wand, the housing having a mounting surface at a free end thereof;
   a light source mounted to the mounting surface;
   a lens mounted to the mounting surface;
   a camera mounted to the mounting surface configured for capturing images of the fiber optic connector;
   an adapter; and
   an adjusting member operably connected between the adapter and the housing,
   wherein the lens encloses the light source and the camera at the free end of the housing, the adapter is configured to mount the wand to a plurality of different fiber optic connectors, and the adjusting member is configured to move the housing toward and away from the fiber optic connector to adjust a distance between the lens and the fiber optic connector such that the lens is configured to selectively and alternately focus on an axial end face and a radial wall of the fiber optic connector.

2. The fiber optic system of claim 1 wherein the wand is a flexible wand.

3. The fiber optic system of claim 1 wherein the light source is one or more light emitting diodes.

4. The fiber optic system of claim 1 wherein the fiber optic connector is an alignment sleeve and wherein the adapter is configured for receipt of alignment sleeves of different shapes and sizes.

5. The fiber optic system of claim 1 wherein the adapter is formed from a resilient material.

6. A method for inspecting a radial face and an axial surface of a fiber optic ferrule comprising:
   providing a fiber optic connector inspection device having a boroscope tool, a wand operably connected to the boroscope tool, the wand having a proximal end at the boroscope tool, and a distal end opposite to the proximal end, a housing disposed at the distal end of the wand, the housing having a mounting surface at a free end thereof, a light source, a camera and a lens, wherein the light source, the camera and the lens are mounted to the mounting surface at the free end of the housing and the lens encloses the light source and the camera at the free end of the housing,
   mounting an adapter that is operably mounted at about the end of the wand to an associated alignment sleeve;
   operably connecting an adjusting member between the adapter and the housing; and
   observing images on a screen operably connected to the boroscope tool,
   wherein the adjusting member is configured to move the housing toward and away from the fiber optic ferrule to adjust a distance between the lens and the fiber optic ferrule such that the lens is configured to selectively and alternately focus on the axial surface and the radial face of the fiber optic ferrule.

7. The method of claim 6 including adjusting a distance between the lens and the associated alignment sleeve with the adjusting member.

* * * * *